United States Patent
Watts et al.

(10) Patent No.: US 12,207,165 B2
(45) Date of Patent: Jan. 21, 2025

(54) SENSOR HIERARCHY FOR CONTEXT INFERENCE

(71) Applicant: NumberEight Technologies Ltd, London (GB)

(72) Inventors: Christopher John Watts, London (GB); Abhishek Sen, London (GB)

(73) Assignee: NumberEight Technologies Ltd, Norwich (GB)

( * ) Notice: Subject to any disclaimer, the term of this patent is extended or adjusted under 35 U.S.C. 154(b) by 508 days.

(21) Appl. No.: 17/601,670

(22) PCT Filed: Apr. 6, 2020

(86) PCT No.: PCT/GB2020/050903
§ 371 (c)(1),
(2) Date: Oct. 5, 2021

(87) PCT Pub. No.: WO2020/201778
PCT Pub. Date: Oct. 8, 2020

(65) Prior Publication Data
US 2022/0167132 A1   May 26, 2022

(30) Foreign Application Priority Data
Apr. 5, 2019   (GB) ...................................... 1904889

(51) Int. Cl.
*H04W 4/38* (2018.01)
*H04W 4/60* (2018.01)
(Continued)

(52) U.S. Cl.
CPC ............... *H04W 4/38* (2018.02); *H04W 4/60* (2018.02); *H04W 8/20* (2013.01); *H04W 24/10* (2013.01); *H04W 84/18* (2013.01)

(58) Field of Classification Search
None
See application file for complete search history.

(56) References Cited

U.S. PATENT DOCUMENTS

2009/0013052 A1*  1/2009  Robarts ............... G06Q 10/107
                                                                709/206
2013/0074096 A1   3/2013  Lillethun et al.
(Continued)

FOREIGN PATENT DOCUMENTS

| EP | 1 199 860 A1 | 4/2002 |
| WO | WO-2013/120723 A1 | 8/2013 |
| WO | WO-2020/201778 A1 | 10/2020 |

OTHER PUBLICATIONS

International Search Report from International Application No. PCT/GB2020/050903; Dated: Sep. 24, 2020.
(Continued)

*Primary Examiner* — Diane L Lo
(74) *Attorney, Agent, or Firm* — Morse, Barnes-Brown & Pendleton, P.C.; Sean D. Detweiler, Esq.

(57) ABSTRACT

The present disclosure relates to a personal computing device configured to provide a sensor hierarchy for a subscriber comprising: a sensor module, configured to receive or retrieve values from a sensor; a memory module, configured to store data indicative of a sensor hierarchy, wherein the sensor hierarchy comprises a plurality of nodes wherein each node comprises at least one hierarchical identifier and at least one node comprises data indicative of the sensor module; and a sensor hierarchy module, configured to: obtain the data indicative of the sensor hierarchy from the memory module; receive a subscription request from the subscriber, wherein preferably the subscription request comprises data indicative of the hierarchical identifier to subscribe to; optionally locate the hierarchical identifier of the subscription request within the sensor hierarchy; and subscribe the subscriber based on the subscription request.

19 Claims, 11 Drawing Sheets

(51) Int. Cl.
*H04W 8/20* (2009.01)
*H04W 24/10* (2009.01)
*H04W 84/18* (2009.01)

(56) References Cited

U.S. PATENT DOCUMENTS

| | | |
|---|---|---|
| 2015/0286933 A1 | 10/2015 | Trivelpiece |
| 2016/0065491 A1* | 3/2016 | Bentley .................. H04L 67/01 |
| | | 709/226 |
| 2016/0065655 A1* | 3/2016 | Bentley .................. H04L 67/10 |
| | | 709/201 |
| 2018/0146058 A1* | 5/2018 | Somayazulu ........... H04L 67/63 |
| 2019/0190999 A1* | 6/2019 | Cheung .................. H04L 67/55 |
| 2020/0175766 A1* | 6/2020 | Gawrys ............... G06F 16/9027 |

OTHER PUBLICATIONS

Search Report from Application No. 1904889.1; Dated: Sep. 9, 2019.

* cited by examiner

SENSOR HIERARCHY FOR CONTEXT INFERENCE

RELATED APPLICATIONS

This application is a national stage filing under 35 U.S.C. 371 of International Application No. PCT/GB2020/050903, filed Apr. 6, 2020, which claims priority to United Kingdom Application No. 1904889.1, filed Apr. 5, 2019. The entire teachings of said applications are incorporated by reference herein. International Application PCT/GB2020/050903 was published under PCT Article 21 (2) in English.

FIELD OF THE INVENTION

The present disclosure relates to a device for constructing and using a sensor hierarchy to allow applications to undertake context inference.

BACKGROUND TO THE DISCLOSURE

Personal computing devices such as smartphones, tablets and smart watches have changed the paradigm of how computer programs are designed. Personal computing devices are low powered (compared to conventional laptops, desktop PCs, servers), run on batteries, and have a greater number of sensors available to them such as GPS, magnetometers, and gyroscopes.

Interesting information can be obtained and inferred based on this superfluity of sensor data. However, personal computing devices have power and battery limitations that can hinder the ability for accurate or complete sensor analysis. In particular, context inference based on a plurality of sensors can be a computationally challenging task, especially for personal computing devices.

Current systems often forward sensor data onto remote servers for processing as servers are not limited by battery life and can have orders of magnitude more processing power than a personal computing device. There are issues with this system around the amount of data being transmitted, privacy concerns regarding ownership of the server and the data, privacy concerns about who retains the data and for how long, time delays and energy costs in sending data to remote locations, and overall user experience.

The present disclosure seeks to overcome the problems outlined above.

SUMMARY OF THE DISCLOSURE

Aspects of the disclosure are set out in the accompanying claims.

According to at least one aspect of the disclosure herein, there is provided a computing device, optionally a personal computing device, configured to provide a sensor hierarchy for a subscriber comprising a sensor module, configured to receive or retrieve values from a sensor; a memory module, configured to store data indicative of a sensor hierarchy, wherein the sensor hierarchy comprises a plurality of nodes wherein each node comprises at least one hierarchical identifier and at least one node comprises data indicative of the sensor module; and a sensor hierarchy module, configured to: obtain the data indicative of the sensor hierarchy from the memory module; receive a subscription request from the subscriber, wherein preferably the subscription request comprises data indicative of the hierarchical identifier to subscribe to; optionally locate the hierarchical identifier of the subscription request within the sensor hierarchy; and subscribe the subscriber based on the subscription request.

A personal computing device may be any computing device that can be operated by a person. An exemplary personal computing device is described with reference to FIG. 1 of this document, where the modules of the claim may correspond to the components described with reference to that description.

Preferably, the subscriber receives sensor data from the sensor module according to the subscription request.

Preferably subscribing the subscriber to the hierarchical identifier comprises arranging for sensor data from at least one of the child nodes of the node corresponding to the hierarchical identifier to be sent to the subscriber.

Preferably the subscriber is configured to provide context inference based on the hierarchical identifiers the subscriber is subscribed to.

Preferably the subscriber is an application or a component of an application.

Preferably the subscription request further comprises data indicative of a quality of service requirement.

Preferably the sensor module is a physical sensor module.

Preferably the sensor module is a virtual sensor module configured to receive data from at least one further sensor module(s).

Preferably the subscriber is a virtual sensor module configured to receive data from at least one other sensor module.

According to another aspect of the disclosure herein, there is provided a computing device, optionally a personal computing device, configured to provide a sensor hierarchy for a subscriber comprising: a sensor module, configured to receive or retrieve values from a sensor and wherein the sensor module is a virtual sensor configured to receive data from at least one other sensor module; a memory module, configured to store data indicative of a sensor hierarchy, wherein the sensor hierarchy comprises a plurality of nodes wherein each node comprises at least one hierarchical identifier and at least one node comprises data indicative of the sensor module; and a sensor hierarchy module, configured to: receive data indicative of the sensor module; identify at least one output hierarchical identifier describing the sensor module based on the data indicative of the sensor module; identify at least one input hierarchical identifier to subscribe the sensor module to; and optionally insert a node in the sensor hierarchy indicative of the sensor module.

Preferably the virtual sensor comprises a model.

Preferably the model receives input from the at least one hierarchical identifier the virtual sensor is subscribed to.

Preferably the model outputs at least one output to be subscribed to by a subscriber.

Preferably the subscriber is an application or a further virtual sensor.

Preferably the output of the model is a context inference based on the at least one input hierarchical identifier.

Preferably the sensor hierarchy module further configured to: receive data indicative of a quality of service requirement, wherein the data indicative of a quality of service requirement comprises a hierarchical identifier and quality of service requirement.

According to another aspect of the disclosure herein, there is provided a computing device, optionally a personal computing device, configured to provide a sensor hierarchy for a subscriber comprising: a sensor module, configured to receive or retrieve values from a sensor; a memory module, configured to store data indicative of a sensor hierarchy, wherein the sensor hierarchy comprises a plurality of nodes wherein each node comprises at least one hierarchical identifier and at least one node comprises data indicative of the sensor module; and a sensor hierarchy module, configured to: receive data indicative of a quality of service requirement, wherein the data indicative of a quality of service requirement comprises a hierarchical identifier and quality of service requirement; and optionally update a subscription associated with the hierarchical identifier according to the quality of service requirement.

Preferably the quality of service requirement specifies a minimum level of service of a subscription associated with the hierarchical identifier.

Preferably the quality of service requirement is any one or more of the following: a rate at which data is to be produced for a subscription associated with the hierarchical identifier, a specification for bursts of data to be produced for a subscription associated with the hierarchical identifier, a maximum amount of power to be consumed for a subscription associated with the hierarchical identifier, or an accuracy of data to be produced for a subscription associated with the hierarchical identifier.

Preferably the sensor hierarchy receives further data indicative of a quality of service requirement data in conflict with the first data indicative of a quality of service; and selects a quality of service requirement to adhere to both the first quality of service requirement and the further quality of service requirement.

Preferably the sensor module is configured to transmit sensor health metric data, the health metric data comprises data indicative of the sensor and capabilities of the sensor.

According to another aspect of the disclosure herein, there is provided a computing device, optionally a personal computing device, configured to provide a sensor hierarchy for a subscriber comprising: a sensor module, configured to receive or retrieve values from a sensor and transmit sensor health metric data, the health metric data comprises data indicative of the sensor and capabilities of the sensor; a memory module, configured to store data indicative of a sensor hierarchy, wherein the sensor hierarchy comprises a plurality of nodes wherein each node comprises at least one hierarchical identifier and at least one node comprises data indicative of the sensor module; and a sensor hierarchy module, configured to: obtain the data indicative of the sensor hierarchy from the memory module; receive sensor health metric data and optionally transmit it to any subscribers of the sensor module or parents of the sensor module within the sensor hierarchy.

Preferably the health metric data comprises any one or more of the following: sensor manufacturer and model name, sensor power consumption, maximum sensor data frequency achievable, minimum sensor data frequency available, maximum sensor data precision achievable, maximum sensor data accuracy achievable, sensor data latency, known bugs of the sensor, and/or other known limitations of the sensor.

Preferably the subscriber receiving sensor health metric data modifies its behaviour.

Preferably the subscriber is a virtual sensor comprising a model and upon receiving sensor health metric data, the model is dynamically updated to account for the sensor health metric data.

According to another aspect of the disclosure herein, there is provided a computing device, optionally a personal computing device, configured to provide a sensor hierarchy for a subscriber comprising: a plurality of sensor modules, configured to receive or retrieve values from a sensor; a memory module, configured to store data indicative of a sensor hierarchy; and a sensor hierarchy module, configured to: obtain the sensor hierarchy; receive data indicative of the each of the sensor modules; and for each of the data indicative of the sensor module: identify at least one hierarchical identifier based on the data indicative of the sensor module; locate and/or insert a node in the sensor hierarchy corresponding to each hierarchical identifier; optionally update each node in the sensor hierarchy corresponding to each hierarchical identifier with data to enable a subscriber to subscribe to the node; and optionally store the sensor hierarchy in the memory module.

Preferably obtaining the sensor hierarchy comprises creating an empty sensor hierarchy with only a root node.

Preferably obtaining the sensor hierarchy comprises retrieving or receiving the sensor hierarchy from the memory module.

Preferably at least one of the sensor modules is a physical sensor.

Preferably at least one of the sensor modules is a virtual sensor.

According to another aspect of the disclosure herein, there is provided a computing device, optionally a personal computing device, configured to provide a sensor hierarchy for a subscriber comprising: a virtual sensor module, configured to receive or retrieve values from a sensor and wherein the sensor module is a virtual sensor configured to receive data from at least one other sensor module; a memory module, configured to store data indicative of a sensor hierarchy; and a sensor hierarchy module, configured to: obtain the sensor hierarchy; receive data indicative of virtual sensor module; identify at least one hierarchical identifier based on the data indicative of the virtual sensor module; locate and/or insert a node in the sensor hierarchy corresponding to the hierarchical identifier; and optionally update the node in the sensor hierarchy corresponding to the hierarchical identifier with data to enable a subscriber to subscribe to the node.

Preferably the data indicative of virtual sensor module comprises a model.

Preferably the sensor hierarchy module is further configured to subscribe the virtual sensor module to another hierarchical identifier in the sensor hierarchy.

According to another aspect of the disclosure herein, there is provided a method of providing a sensor hierarchy for an application comprising: obtaining the data indicative of the sensor hierarchy from a memory; receiving a request from the application, wherein the sensor request comprises data indicative of a hierarchical identifier; locating the hierarchical identifier of the sensor request within the sensor hierarchy; and providing data relating to the hierarchical identifier to the application.

Preferably the step of providing sensor data is subscribing the application to the hierarchical identifier.

Preferably the step of providing sensor data is directly sending the data corresponding to the hierarchical identifier to the application.

According to another aspect of the disclosure herein, there is provided a method of providing a sensor hierarchy for an application comprising: obtaining the data indicative of the sensor hierarchy from a memory; receiving data indicative of the virtual sensor module, wherein the virtual sensor is configured to receive data from at least one other sensor module; identifying at least one output hierarchical identifier describing the virtual sensor module based on the data indicative of the sensor module; identifying at least one input hierarchical identifier to subscribe the virtual sensor module to; and inserting a node in the sensor hierarchy indicative of the sensor module.

According to another aspect of the disclosure herein, there is provided a method of providing a sensor hierarchy for an application comprising: receiving data indicative of a quality of service requirement, wherein the data indicative of a quality of service requirement comprises a hierarchical identifier and quality of service requirement; and updating a subscription associated with the hierarchical identifier according to the quality of service requirement.

According to another aspect of the disclosure herein, there is provided a method of providing a sensor hierarchy for an application comprising: obtaining data indicative of the sensor hierarchy from the memory module; receiving sensor health metric data, wherein the sensor health metric data describes the status and/or performance characteristics of a sensor module; identifying subscribers of the sensor and/or any parents of the sensor module within the sensor hierarchy; and transmitting the sensor health metric data to any subscribers of the sensor module and/or parents of the sensor module within the sensor hierarchy.

According to another aspect of the disclosure herein, there is provided a method of providing a sensor hierarchy for an application comprising: obtaining the data indicative of the sensor hierarchy from a memory; receiving data indicative of a sensor module; identifying at least one hierarchical identifier based on the data indicative of the sensor module; locating and/or inserting a node in the sensor hierarchy corresponding to each hierarchical identifier; update each node in the sensor hierarchy corresponding to each hierarchical identifier with data to enable an application to access data at the node; and storing the sensor hierarchy in the memory.

Any feature described as being carried out by an apparatus, an application, and a device may be carried out on any of an apparatus, an application, or a device. Where multiple apparatuses are described, each apparatus may be located on a single device.

Any feature in one aspect of the disclosure may be applied to other aspects of the invention, in any appropriate combination. In particular, method aspects may be applied to apparatus aspects, and vice versa.

Furthermore, features implemented in hardware may be implemented in software, and vice versa. Any reference to software and hardware features herein should be construed accordingly.

Any apparatus feature as described herein may also be provided as a method feature, and vice versa. As used herein, means plus function features may be expressed alternatively in terms of their corresponding structure, such as a suitably programmed processor and associated memory.

It should also be appreciated that particular combinations of the various features described and defined in any aspects of the disclosure can be implemented and/or supplied and/or used independently.

The disclosure also provides a computer program and a computer program product comprising software code adapted, when executed on a data processing apparatus, to perform any of the methods described herein, including any or all of their component steps.

The disclosure also provides a computer program and a computer program product comprising software code which, when executed on a data processing apparatus, comprises any of the apparatus features described herein.

The disclosure also provides a computer program and a computer program product having an operating system which supports a computer program for carrying out any of the methods described herein and/or for embodying any of the apparatus features described herein.

The disclosure also provides a computer readable medium having stored thereon the computer program as aforesaid.

The disclosure also provides a signal carrying the computer program as aforesaid, and a method of transmitting such a signal.

The disclosure extends to methods and/or apparatus substantially as herein described with reference to the accompanying drawings.

It can also be appreciated that the methods can be implemented, at least in part, using computer program code. According to another aspect of the present disclosure, there is therefore provided computer software or computer program code adapted to carry out these methods described above when processed by a computer processing means. The computer software or computer program code can be carried by computer readable medium, and in particular a non-transitory computer readable medium. The medium may be a physical storage medium such as a Read Only Memory (ROM) chip. Alternatively, it may be a disk such as a Digital Video Disk (DVD-ROM) or Compact Disk (CD-ROM) or it may be a magnetic medium such as a tape drive. It could also be a signal such as an electronic signal over wires, an optical signal or a radio signal such as to a satellite or the like. The disclosure also extends to a processor running the software or code, e.g. a computer configured to carry out the methods described above.

Each of the aspects above may comprise any one or more of the features mentioned in respect of the other aspects above.

Use of the words "apparatus", "device", "processor", "sensor", "module", "unit" and so on are intended to be general rather than specific. Whilst these features of the disclosure may be implemented using an individual component, such as a computer or a central processing unit (CPU), they can equally well be implemented using other suitable components or a combination of components. For example, they could be implemented using a hard-wired circuit or circuits, e.g. an integrated circuit, and using embedded software.

It should be noted that the term "comprising" as used in this document means "consisting at least in part of". So, when interpreting statements in this document that include the term "comprising", features other than that or those prefaced by the term may also be present. Related terms such as "comprise" and "comprises" are to be interpreted in the same manner. As used herein, "(s)" following a noun means the plural and/or singular forms of the noun.

Preferred embodiments are now described, by way of example only, with reference to the accompanying drawings.

DETAILED DESCRIPTION OF PREFERRED EMBODIMENTS

Devices with large numbers of sensors, or devices that connect to large numbers of sensors are able to collect a large amount of data. Coordinating sensor data collection can be a daunting task depending on how much data each application running on the device needs, how many applications are running, how many sensors there are, the type of data being read, the complexity of inference of sensor data, and more. Managing sensors, data, and applications is a complex task and requires smart data structures, systems, and apparatuses to solve the problem. To further complicate the system, often these devices are personal computing devices. Personal computing devices include smartphones, tablets, and smartwatches. Personal computing devices are often resource limited, computing power limited, and are battery powered (further putting limitations on the computing power available) among other limitations. Further, operating systems that run on personal computing devices often limit the amount of power each application can run effectively blocking applications that consume too much power from running.

Figure 7:
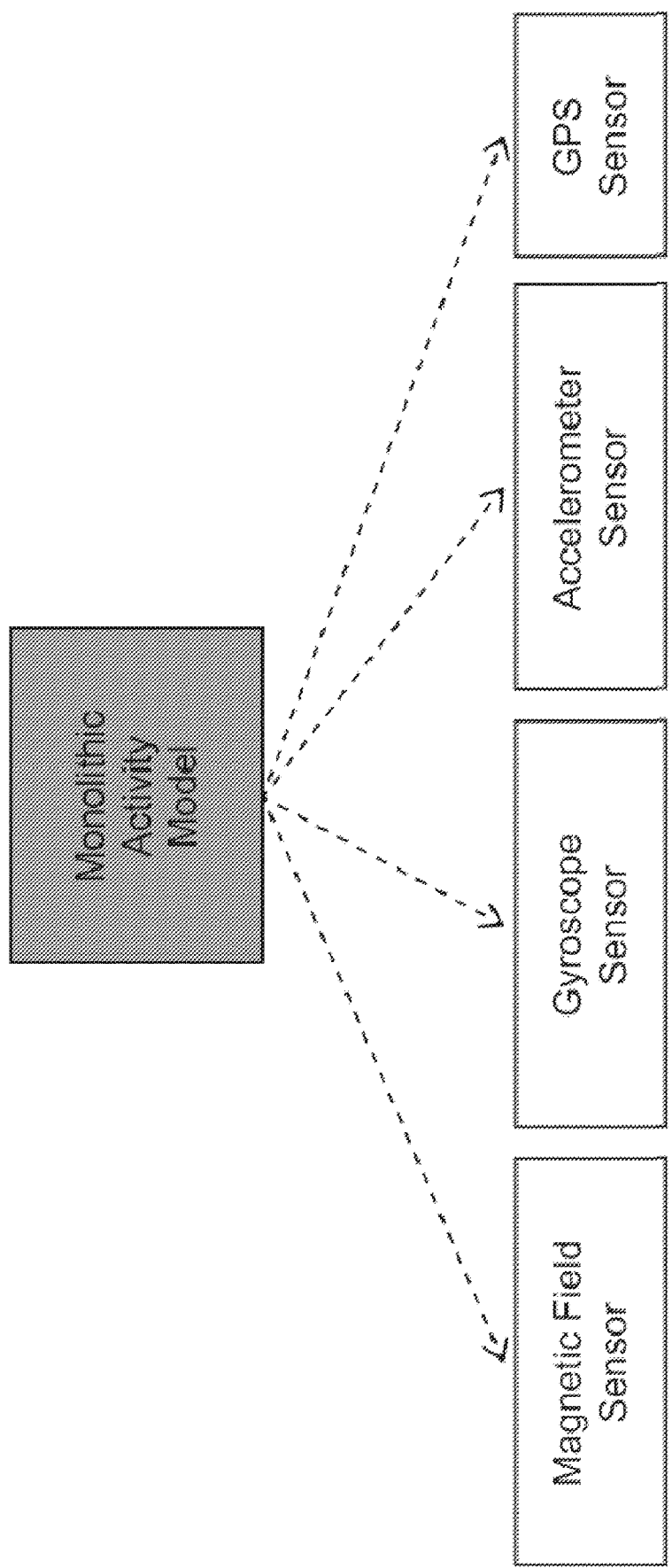
FIG. 7 is a prior art activity inference system.

In the fields of human activity recognition and context inference, it is common for a multitude of sensors to be used concurrently. State-of-the-art context inference systems typically communicate with physical sensors independently. Inference models then periodically analyse the raw sensory data to produce a high-level contextual statement directly, such as "commuting to work". An example prior art context inference system is shown in FIG. 7.

This process is often complex and power-intensive, so it is not often deployed in personal computing devices directly, instead relying on a sending the data to remote servers to process the sensor data. In this embodiment, a systems, apparatuses, and methods, for efficiently managing large groups of sensors are shown.

While the embodiments presented in this description are described with reference to personal computing devices, a person skilled in the art will appreciate that the embodiments may also be applied to other computing systems such as laptops, desktops, servers, and mainframes. The advantages that the embodiments presented in this document provide are less applicable to these other computing devices as it is with personal computing devices.

Personal Computing Device

Figure 1A:
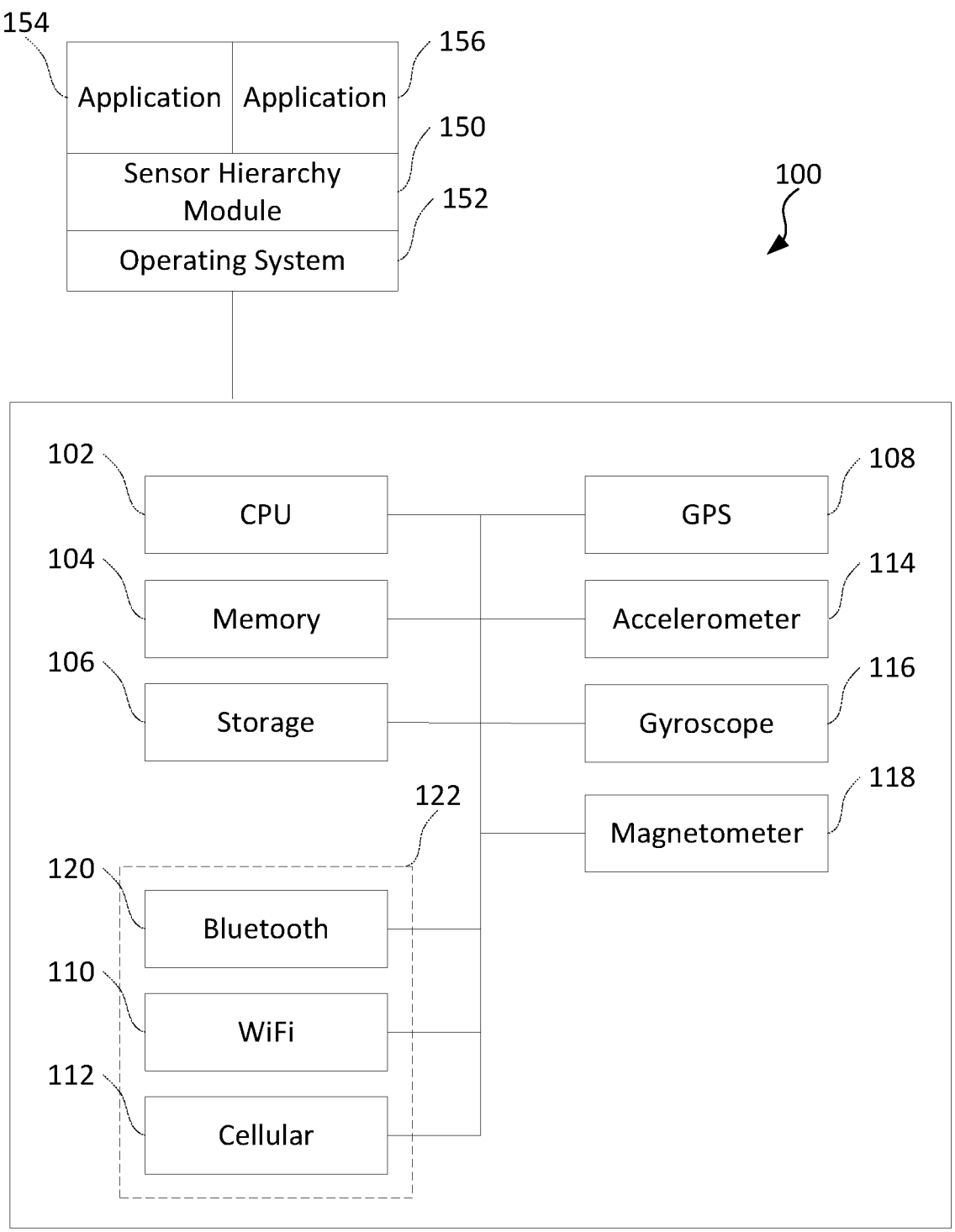
FIGS. 1a and 1b are a high level block diagram of a personal computing device with a sensor hierarchy module.

Referring to FIG. 1a, a personal computing device 100 comprises a Central Processing Unit (CPU) 102, memory 104, storage 106, GPS sensor module 108, WiFi module 110, cellular network module 112, accelerometer module 114, gyroscope module 116, and magnetometer module 118. The GPS sensor 108, WiFi 110, cellular network 112, accelerometer 114, gyroscope 116, magnetometer 118, and Bluetooth 120 modules can all function as a sensor directory or indirectly. For example the magnetometer module 118 is configured to sense magnetic fields directly. The WiFi module 110 and sense and identify WiFi networks directly, by sensing and identifying WiFi networks, multilateration can be used to detect motion and/or location. It should therefore be understood that, in the context of this embodiment, the described personal computing device 100 is just one example of an appropriate device that can be used with sensors. Further sensors can also be connected to the personal computing device via Bluetooth, WiFi, cellular, or other communications systems. A person skilled in the art will appreciate that other sensors can be used as a part of a personal computing device or be connected to the personal computing device.

The CPU 102 is a computer processor, e.g. a microprocessor. It is arranged to execute instructions in the form of computer executable code, including instructions stored in the memory 104 and the storage 106. The instructions executed by the CPU 102 include instructions for coordinating operation of the other components of the personal computing device 100, such as instructions for controlling the communication modules 110, 112, 120 and sensor modules 108, 114, 116, 118, as well as other features of a personal computing device 100 such as a user interface (not shown) and audio system (not shown). Applications 154, 156 may be installed on the personal computing device 100. Applications 154, 156 have associated instructions that are also in the form of computer executable code, stored in the memory 104 and the storage 106. Applications 154, 156 also have instructions for reading sensor values from any one or more of the sensor modules 108, 114, 116, 118 and/or communication modules 110, 112, 120.

The memory 104 is implemented as one or more memory units providing Random Access Memory (RAM) for the personal computing device 100. In the illustrated embodiment, the memory 104 is a volatile memory, for example in the form of an on-chip RAM integrated with the CPU 102 using System-on-Chip (SoC) architecture. However, in other embodiments, the memory 104 is separate from the CPU 102. The memory 104 is arranged to store the instructions processed by the CPU 102, in the form of computer executable code. Typically, only selected elements of the computer executable code are stored by the memory 104 at any one time, which selected elements define the instructions essential to the operations of the personal computing device 100 being carried out at the particular time. In other words, the computer executable code is stored transiently in the memory 104 whilst some particular process is handled by the CPU 102.

The storage 106 is provided integrally and/or removable with the personal computing device 100, in the form of a non-volatile memory. The storage 106 is in most embodiments embedded on the same chip as the CPU 102 and the memory 104, using SoC architecture, e.g. by being implemented as a Multiple-Time Programmable (MTP) array. However, in other embodiments, the storage 106 is an embedded or external flash memory, or such like. The storage 106 stores computer executable code defining the instructions processed by the CPU 102. The storage 106 stores the computer executable code permanently or semi-permanently, e.g. until overwritten. That is, the computer executable code is stored in the storage 106 non-transiently. Typically, the computer executable code stored by the storage 106 relates to instructions fundamental to the operation of the CPU 102, sensor modules 108, 114, 116, 118, communication modules 110, 112, 120, and other installed applications 154, 156.

The communication interface group 122 supports short-range wireless communication, in particular Bluetooth® and WiFi communication, and long-range wireless communication, in particular cellular communication. In particular, the communications interface group 122 is configured to establish the short-range wireless communication connections with other personal computing devices or sensors.

The user interface comprises a display and input device. In this embodiment, the display is a plurality of separate indicators, such as Light Emitting Diodes (LEDs). In other embodiments, the display is a screen, such as a Thin-Film-Transistor (TFT) Liquid Crystal Display (LCD) display or an Organic Light Emitting Diode (OLED) display, or other appropriate display. The input device is one or more user operable buttons, responsive to depression, toggling or touch by the user. The user interface is arranged to provide indications to the user, under the control of the CPU 102, and to receive inputs from the user, and to convey these inputs to the CPU 102 via the communications bus.

The personal computing device 100 comprises a sensor hierarchy module 150. In this embodiment, the sensor hierarchy module 150 is implemented as a software module. The sensor hierarchy module 150 exists as a form of hardware abstraction layer between the operating system 152 and applications 154, 156. The sensor hierarchy module 150 is configured to create and execute the aspects of the sensor hierarchy (or hierarchies) 200, 250 described throughout this document and in particular in the section titled "Sensor Hierarchy" and with reference to FIGS. 2a, 2b, 3a, 3b, and 4. The sensor hierarchy module 150 provides an interface for other applications 154, 156 to access and use the sensor hierarchy programmatically. In this embodiment, the interface is in the form of a software development kit (SDK). Alternatively, an application programming interface (API), application binary interface (ABI) or other software system may be used.

Figure 1B:
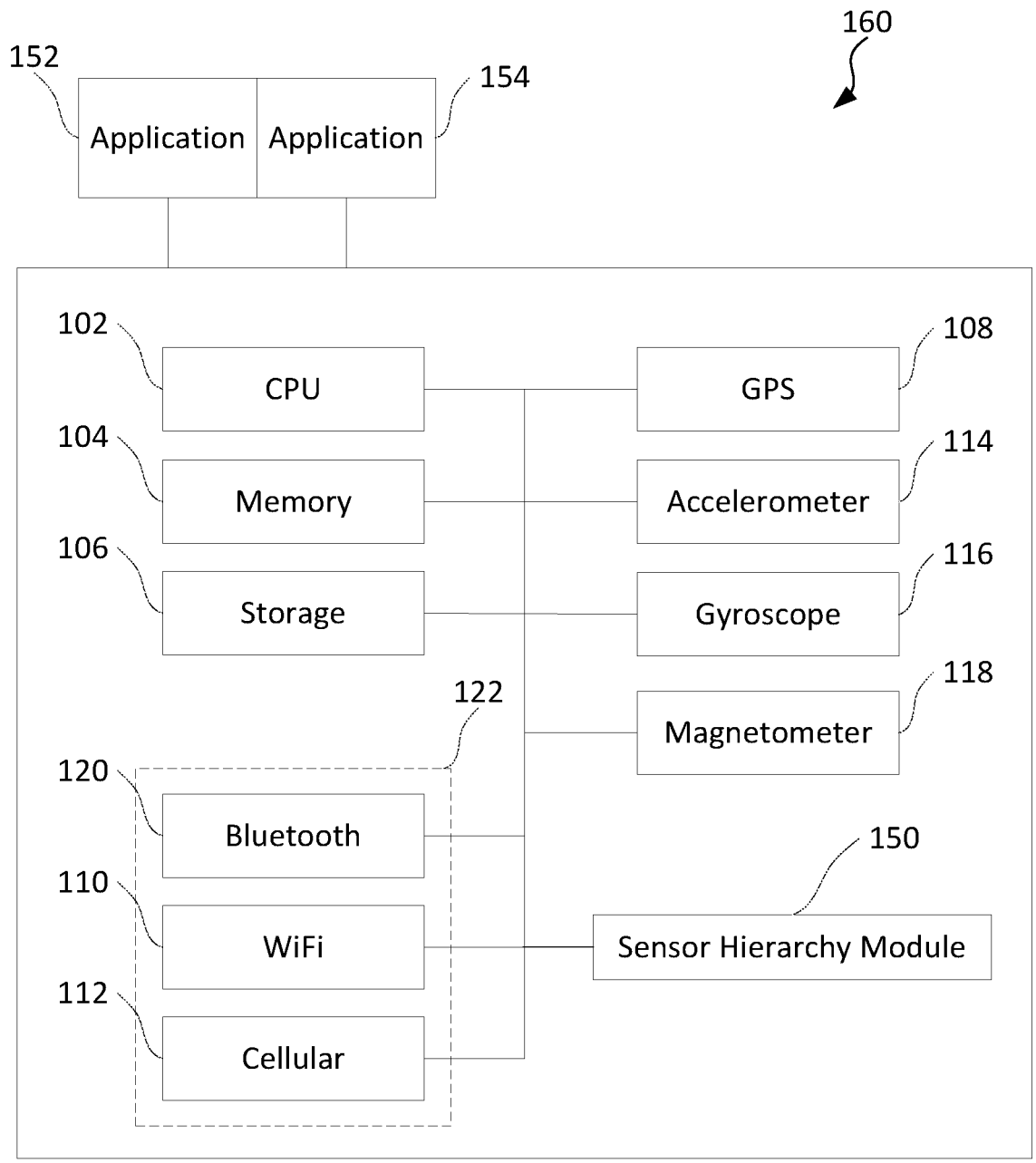

Referring to FIG. 1b, an alternative embodiment is shown where the sensor hierarchy module 150 is implemented as a hardware module as part of the personal computing device 160. The sensor hierarchy module 150 is implemented as an FPGA. Alternatively, the sensor hierarchy module 150 is implemented as an ASIC or part of a System on Chip with the other hardware modules.

Sensor Hierarchy

Figure 2A:
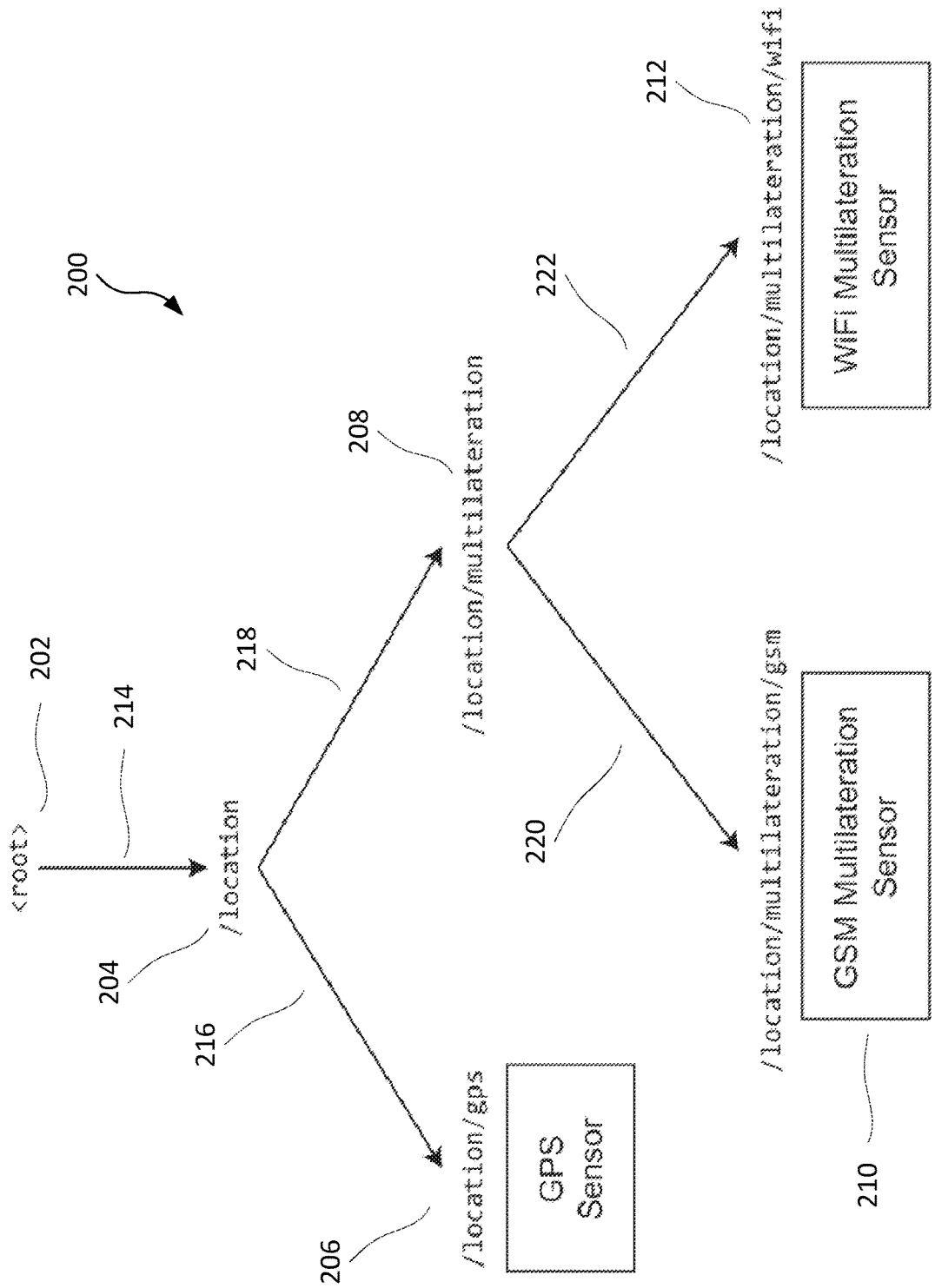
FIGS. 2a and 2b are example sensor hierarchies.

Referring to FIG. 2a, a sensor hierarchy 200 comprises a plurality of nodes 202, 204, 206, 208, 210, 212 and edges 214, 216, 218, 220, 222. The sensor hierarchy 200 is a directed acyclic graph. In this particular example, the sensor hierarchy 200 is a tree; however in some cases the sensor hierarchy is not a tree when a node has more than one parent. The sensor hierarchy 200 is shown here by way of example only. More complex sensor hierarchies with a greater number of nodes and edges will be more common in real-world implementations. A simple sensor hierarchy 200 is shown here for illustrative purposes. The edges 214, 216, 218, 220, 222 show a hierarchical relationship where the arrow points from parent to child. For example, "<root>" node 202 is the parent of the "/location" node 204 and the "/location" node 204 is the child of the "<root>" node. Nodes can have none, one, or more than one parent. Equally, nodes can have none, one, or more than one children. All nodes in the sensor hierarchy 200 comprise at least one hierarchical identifier, and computer readable data configured to allow an application to subscribe to or access the hierarchical identifier values (i.e. the child sensor values if there are any or the sensor values themselves if the node is a sensor).

In an alternative embodiment, no root node is used. In this case, the graph is not completely connected.

The leaf nodes 206, 210, 212 relate to sensors. In particular, the leaf nodes 206, 210, 212 comprise data indicative of the sensors they are representing. Typically, all leaf nodes relate to physical sensors. Regarding nodes within the sensor hierarchy 200, data indicative of the sensor comprises a name, at least one hierarchical identifier, and computer readable data configured to allow an application to subscribe to or access the sensor values. In this embodiment, the computer readable data configured to allow an application to subscribe to or access the sensor values is an application programming interface (API). Alternatively, the computer readable data configured to allow an application to subscribe to or access the sensor values is a function pointer, a memory reference, a database reference, an entry in a virtual function table, or an application binary interface (ABI). A person skilled in the art will appreciate that there are a number of different methods computers can use to call functions, subscribe to data, and/or access data on a computing device. In another alternative, the computer readable data configured to allow an application to subscribe to or access the sensor values is the hierarchical identifier. The subscribing application is configured to send the hierarchical label to the sensor hierarchy module 150 and the sensor hierarchy module 150 is configured to arrange the subscription.

Where a subscription is described in any embodiment of this disclosure, a person skilled in the art will appreciate that immediate or direct access of the hierarchical identifier may also be possible. Subscription is provided as the primary example.

Apart from the root node 202, each node in the sensor hierarchy 200, 250 includes a hierarchical identifier. The hierarchical identifier can also be described as a topic. While hierarchical identifiers are denoted by strings in this example embodiment, other implementations of hierarchical identifiers can also be used such as integers, memory addresses, register addresses, or similar. The hierarchical identifier acts as a point for abstracting the sensors to different layers and as a point for applications 154, 156 to subscribe to. For example in the sensor hierarchy 200 of FIG. 2A, an application wanting to subscribe to or access location data will traverse the sensor hierarchy 200 to the "/location" hierarchical identifier. If the application wants to be more specific about the type or format of location data, such as wanting GPS data, then the sensor hierarchy 200 is traversed to find the "/location/gps" hierarchical identifier which is a child of "/location". This parent/child relationship is why the labels are called "hierarchical identifiers". The node 204 associated with the "/location" hierarchical identifier comprises data indicative of the child nodes "/location/gps" and "/location/multilateration". The data indicative of the child nodes may be pointers such as memory addresses. Alternative data indicative of child nodes may be API calls or functions. A person skilled in the art will appreciate that there are different methods for one data point to refer to or provide access to another data point or data source.

The sensor hierarchy 200 provides a way to group the sensors into varying levels of abstraction. Each level of abstraction is a hierarchical identifier that adds onto the preceding (if there is a preceding one). When a hierarchical identifier is subscribed to (by an application for example), all sensors that are child nodes of the hierarchical identifier or sensors that are traversable to, given the directionality of the edges, from the hierarchical identifier are configured to be able to provide data to the subscriber. Similarly, if data from a hierarchical identifier is to be directly or immediately accessed, all sensors that are child nodes of the hierarchical identifier or sensors that are traversable to, given the directionality of the edges, from the hierarchical identifier are configured to be able to provide data to the requesting application. For example, if an application is only interested in location data, the application will subscribe to the "/location" hierarchical identifier. The system is then configured to provide location data to the subscriber. The location data can be data from any one or more of the GPS sensor, the GSM based multilateration, and/or WiFi based multilateration.

Figure 2B:
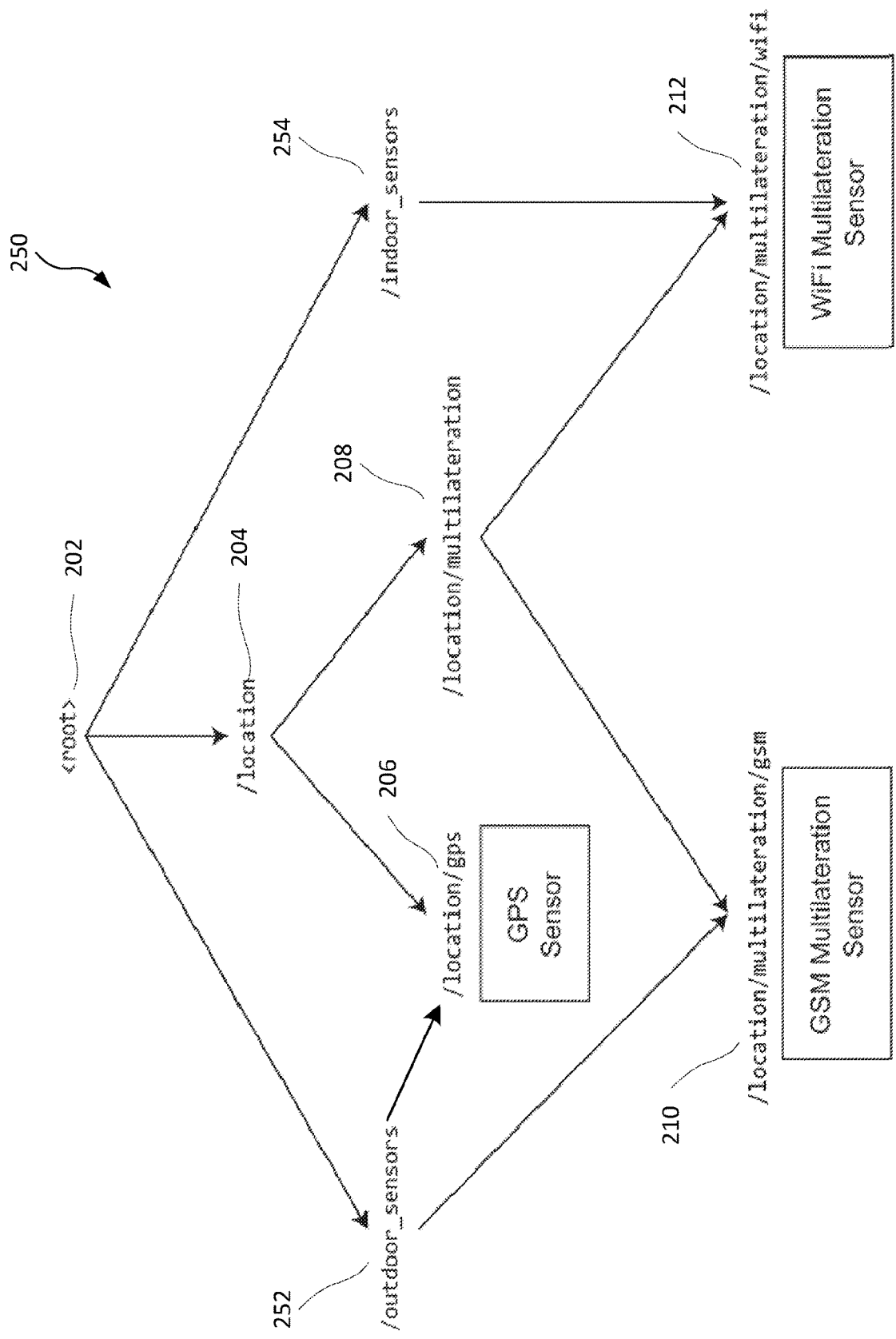

Referring to FIG. 2b, an example sensor hierarchy 250 comprises a plurality of nodes 202, 204, 206, 208, 210, 212, 252, 254 and edges.

The sensor hierarchy 250 is similar to the sensor hierarchy 200 of FIG. 2a except that it comprises two further nodes 252, 254. The sensor hierarchy 250 shows how a sensor can have multiple parents. The sensor hierarchy 250 is not a tree in this case as some of the nodes 206, 210, 212 have more than one parent. The sensor hierarchy 250 is still a directed acyclic graph, and is connected in the sense mentioned above, due to the presence of the root node. An application can be configured to subscribe to "/outdoor_sensors" and "/location", and in the sensor hierarchy 250 the application may receive data from a single sensor: the GPS sensor. In sensor hierarchy 200, the node where the GPS sensor is located has only one hierarchical identifier "/location/gps". In sensor hierarchy 250, the node the GPS sensor is located can have more than hierarchical identifier. In sensor hierarchy 250, the node at which the GPS sensor is located has both "/location/gps" and "/outdoor_sensors/gps" hierarchical labels.

The sensor hierarchy module 150 is configured to create the sensor hierarchy and store the data that represents the sensor hierarchy on the memory 104 and/or storage 106. The sensor hierarchy module 150 is configured to obtain the sensor hierarchy. Obtaining the sensor hierarchy means creating the sensor hierarchy and/or retrieving or receiving the sensor hierarchy from memory 104 and/or storage 106. If the sensor hierarchy is not in memory 104 or storage 106 then the sensor hierarchy will need to be created.

Figure 3A:
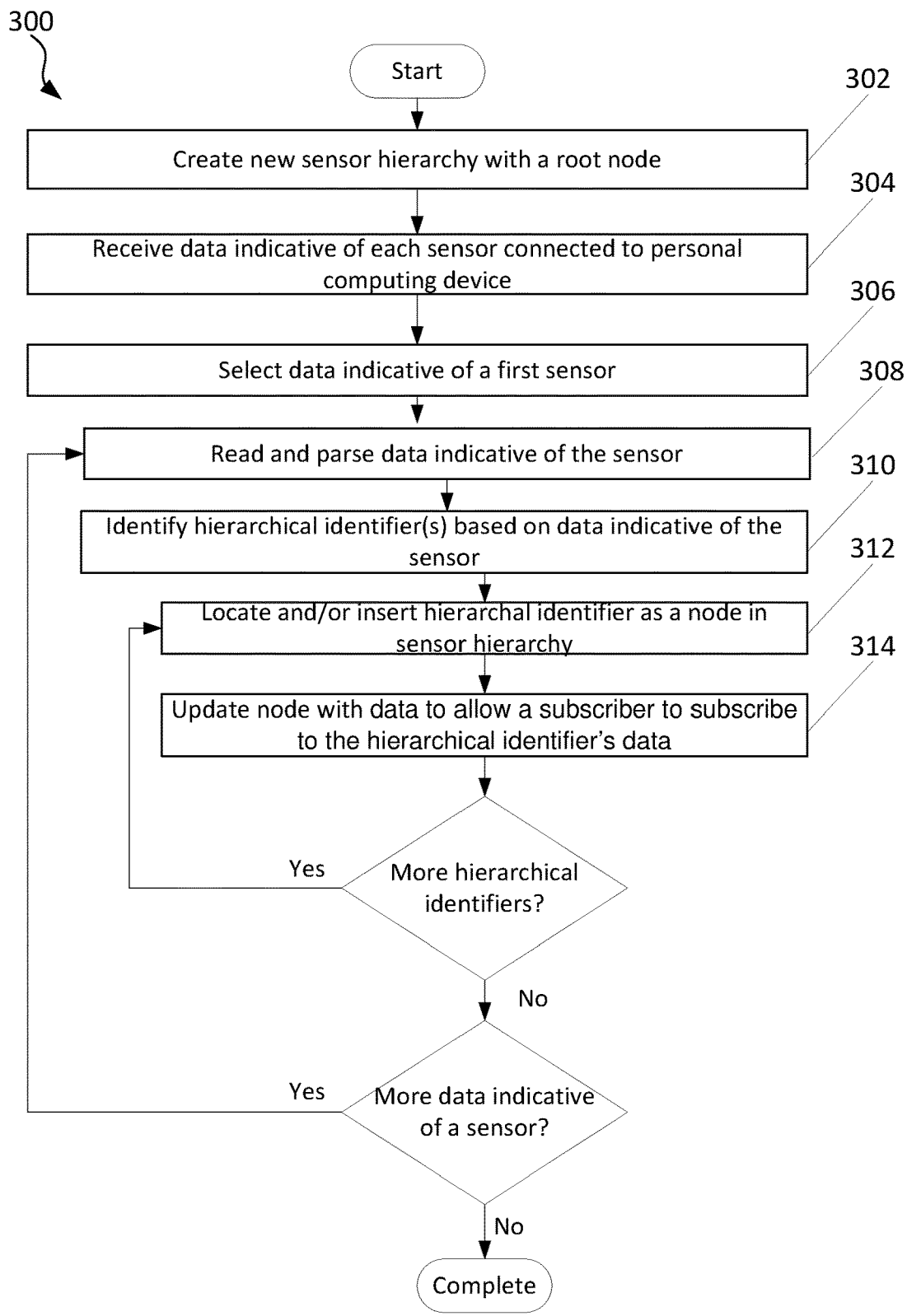
FIGS. 3a and 3b are flow diagrams showing methods of creating and inserting sensors into sensor hierarchies.

Referring to FIG. 3a, the method 300 for creating a sensor hierarchy is described. The method of creating the sensor hierarchy is performed by the sensor hierarchy module 150. The sensor hierarchy module 150 creates a new sensor hierarchy data structure with a root node 302. The sensor hierarchy module 150 receives 304 data describing a sensor (also described as data indicative of a sensor) for each sensor the personal computing device 100 is connected to or configured to receive sensor data from. For each sensor, the data indicative of said sensor is read and parsed 308 by the sensor hierarchy module 150. The sensor hierarchy module 150 identifies 310 at least one hierarchical identifier for the sensor. The sensor hierarchy module 150 locates and/or inserts 312 the appropriate nodes for each hierarchical identifier. Locating requires the sensor hierarchy module 150 searching the tree for a node of the same hierarchical identifier. If the node is not located, then a new one is created and inserted. Inserting the node requires locating the correct hierarchical layer within the sensor hierarchy to insert it and link the node to the appropriate parent and child nodes. Finally, the created or located node is updated or updates 314 with data to allow a subscriber to subscribe to the hierarchical identifier's data.

A person skilled in the art will appreciate that these steps need not occur in the exact order as presented and not all steps are required. For example, the sensor hierarchy module 150 may receive 304 data indicative of each sensor connected to personal computing device first and then create 302 the new sensor hierarchy with a root node. Further, reading and parsing 308 the data indicative of the sensor may not be required the data indicative of the sensor is already in a format for the sensor hierarchy module 150 to understand.

The method described with reference to FIG. 3a is now described referring to the sensor hierarchy 250 of FIG. 2b by way of an example. The sensor hierarchy module 150 receives data indicated of the GPS, GSM Multilateration, and WiFi Multilateration sensors. In this example all of these sensors are physical sensors. A physical sensor is a hardware based sensor which detects or measures physical properties of an environment. The physical sensor or sensor module may also comprise supporting software or hardware to produce useful real world physical properties. These sensors are connected to the personal computing device 100. Starting with data indicative of the GPS sensor (arbitrarily, any sensor may be chosen to start with), the sensor hierarchy module 150 analyses the data indicative of the GPS sensor and identifies the hierarchical identifier "/location/gps". The step of identifying the hierarchical identifier comprises referring to a database of pre-identified labels that are already known. Alternatively, a separate user such as a software application writer inputs appropriate hierarchical identifiers, such as the author of the GPS sensor software. In another alternative, the sensor hierarchy module 150 analyses the fact that the GPS sensor returns location data and provides the "/location" label. The "/gps" is appended by default as it is the sensor name. In another alternative embodiment, the data indicative of the GPS sensor comprises the hierarchical identifier(s). Referring back to the present embodiment, other hierarchical identifiers are also identified. In this example, the "/outdoor_sensors/gps" hierarchical identifier is also identified. The sensor tree 250 is constructed by establishing the nodes and edges. One root node is created then a node is created or modified for each hierarchy of each hierarchical identifier. For example, taking the "/location/gps" hierarchical identifier, one node is located or created for the first hierarchical identifier "/location". In this example, no "/location" label exists, so one is created. The parent for this "/location" node is the "<root>" node which does not have a hierarchical identifier. Another node is created for "/location/gps" as a child of the "/location" node. At each node, data configured to allow a subscriber to subscribe to that hierarchical level is stored. In particular, at node "/location/gps", the data for subscribing to the sensor data specific to the GPS sensor is stored. Moving to the next hierarchical identifier, the "/outdoor_sensors/gps" is to be inserted into the tree. A node is created for the hierarchy identifier "/outdoor_sensors" as a child of the root node. The sensor hierarchy module 150 then recognises that the "/outdoor_sensors/gps" hierarchical identifier represents the GPS sensor directly, the same as the "/location/gps". As such, the sensor hierarchy module 150 modifies the sensor hierarchy 250 such that the "/location/gps" node is a child of the "/outdoor_sensors" also and appends a further hierarchical identifier "/outdoor_sensors/gps" to the "/location/gps" node. With this, the GPS sensor can be referenced, accessed and subscribed to using either the "/outdoor_sensors/gps" or "/location/gps" hierarchical identifier. As mentioned above, this process is applied to every sensor available to the personal computing device 100. In the present example, the other two sensors are the "GSM Multilateration" and "WiFi Multilateration" sensors.

Figure 3B:
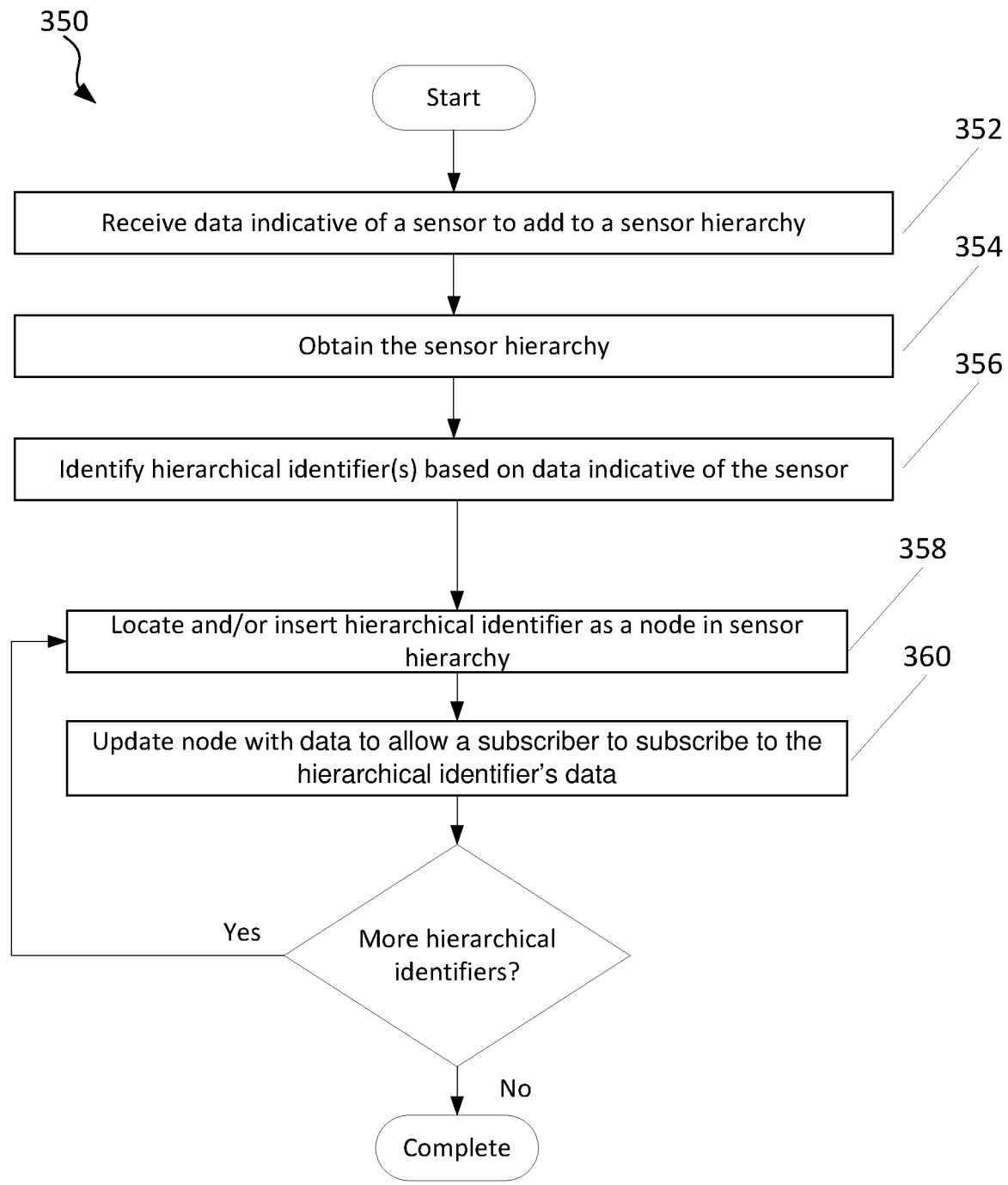

Referring to FIG. 3b, if a new sensor is to be added 350 to an existing sensor hierarchy, a subset of a substantially similar method to the method described with reference to FIG. 3b is used. The sensor hierarchy module 150 receives 352 data indicative of a sensor to add to a sensor hierarchy. The sensor hierarchy module 150 obtains 354 the sensor hierarchy. In this example, the sensor is already present so obtaining the sensor means retrieving the sensor hierarchy from memory. The sensor hierarchy module 150 identifies 356 at least one hierarchical identifier based on the data indicative of the sensor. Each of the at least one hierarchical identifier(s) is located and/or inserted 358 into the sensor hierarchy. Similar to the method described in FIG. 3a, if a node with the same hierarchical identifier is not located, a new one is created and inserted into the sensor hierarchy. The node is updated 360 with data to allow a subscriber to subscribe to the hierarchical identifier's data. In the case of adding a new sensor, it is likely that many of the nodes with appropriate hierarchical labels are already created and as such the nodes will be updated with further children and further data on how to subscribe to the data from the new sensor.

Figure 4:
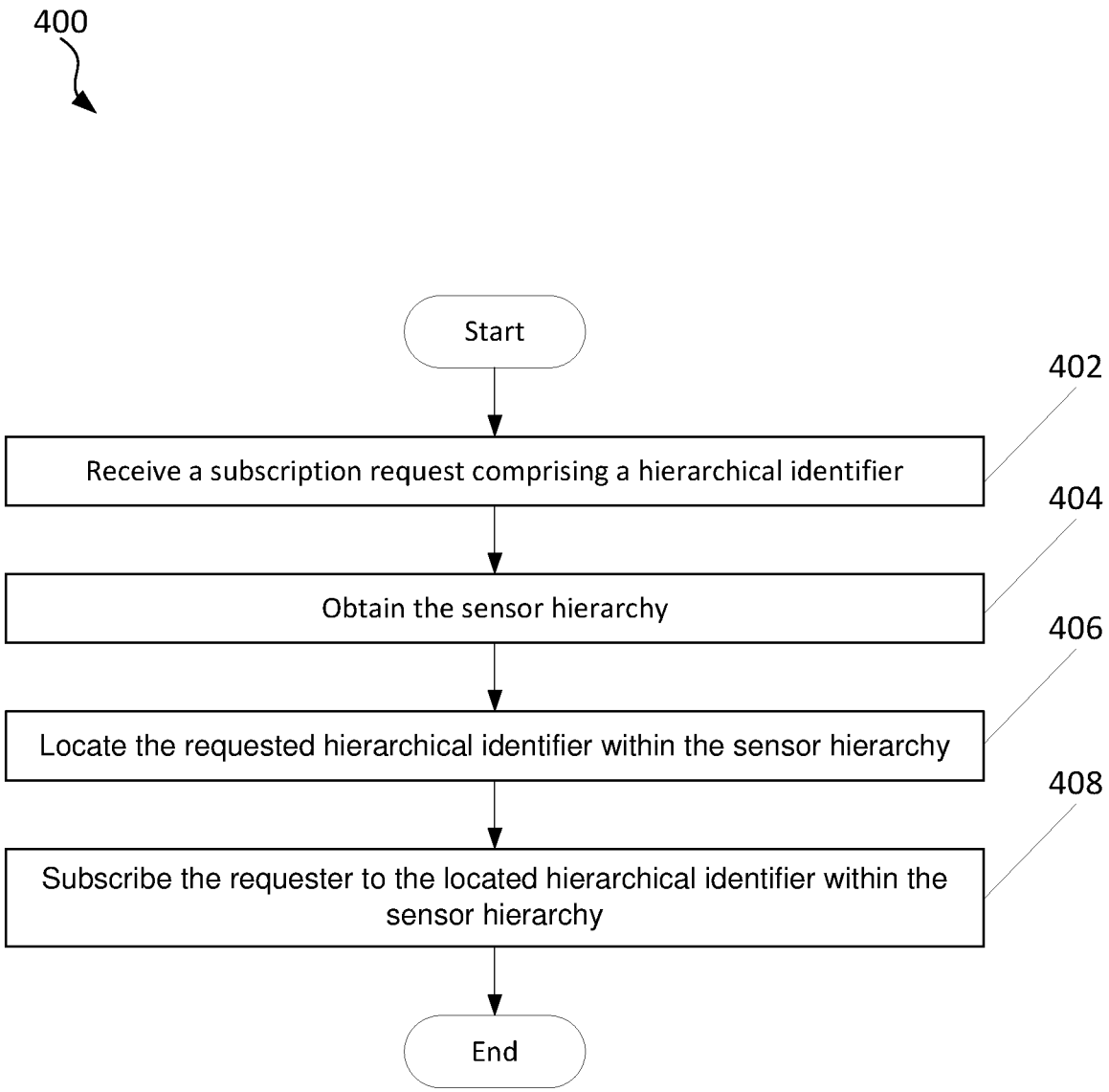
FIG. 4 is a flow diagram showing a method of subscribing to a hierarchical identifier.

Referring to FIG. 4, an example application running on the personal computing device 100 requires sensor data to function. By way of example, the application is a maps routing application and requires current location information to determine the next step(s) a user should take. As such, the routing application needs to subscribe 400 to the location of a user. The application programmatically sends a subscription request to subscribe to the sensor hierarchy module 150. The subscription request comprises the hierarchical identifier the application wants to subscribe to and subscription settings. In this example, the subscription request comprises the "/location" hierarchical identifier. The sensor hierarchy module 150 receives 402 this request and locates 406 the "/location" hierarchical identifier within the sensor hierarchy. If the sensor hierarchy module 150 does not have the sensor hierarchy already loaded, the sensor hierarchy module 150 obtains the sensor hierarchy. If the hierarchical identifier is not located in the sensor hierarchy, the subscription is registered however no data will be received as there are no sensors to provide data for that hierarchical identifier. Alternatively, if the hierarchical identifier is not located in the sensor hierarchy, an error is reported back to the requesting application. The sensor hierarchy module 150 subscribes 408 the requesting application to the "/location" data. The application will now receive "/location" data. In this example, the "/location" data comprises data from any one or more of the "GPS", "GSM Multilateration" and "WiFi Multilateration" sensors. The application receives location related data based on the subscription settings.

In a further embodiment, in addition to the hierarchical identifiers discussed, tag-based identifiers can also be used. Tag-based identifiers function similarly to hierarchical identifiers in that they are nodes within the sensor hierarchy and comprise data for allowing an application (or other subscriber) to subscribe to child sensor data. Tag-based identifiers are used into the sensor hierarchy by having nodes with hierarchical identifiers that don't directly fit with the pre-established hierarchy. That is, the children of the tag-based node are sensors (or other hierarchical identifiers) associated with the tag, rather than the formal structural descriptor as described with reference to FIGS. 2a and 2b. For example, to tag some the accelerometer and gyroscope sensors as "/fast", the "/fast" node is created in the sensor hierarchy with children of "/motion/accelerometer" and "/motion/gyroscope". This allows greater freedom in the construction of sensor hierarchies and provides a more diverse way for applications to interact with the sensor hierarchy.

In the present embodiment, the subscription system is conducted in keeping with conventions of popular message passing architectures. In particular, elements of the Message Queuing Telemetry Transport (MQTT) standard are used. MQTT provides a publish-subscribe-based messaging protocol. In this embodiment, the sensor hierarchy module 150 also acts as the message broker between the applications and sensors. Alternatively, the sensor hierarchy module 150 is configured to configure the message broker to provide data transmittal from the data provided at the hierarchical identifier node to the application subscribed to the hierarchical identifier. A person skilled in the art will understand that other subscription-publishing patterns and systems are known in the art such as Advanced Message Queuing Protocol (AMQP) or Constrained Application Protocol (CoAP). Other non-internet based standards may also be used.

Advantages

A number of advantages arise by providing a hierarchical system of sensors for applications to subscribe to. The system can be run at a lower battery power, require less CPU resources, and less memory resources. The system allows for applications to subscribe to abstraction layers, rather than raw sensors.

In the case when two applications both are requiring location data, both applications will subscribe to the "/location" hierarchical label. With the present graph sensor embodiment, the GPS is polled at a given rate (set by the subscription settings) and the applications subscribing receive the location data which is measured at the given fastest rate. Without the present sensor hierarchy system, each application will poll the GPS sensor separately. This will potentially drain the battery twice as fast because the GPS sensor is being accessed twice as often.

In another example, an application subscribing to the "/location" hierarchical label of a sensor hierarchy and "/location" has two child physical sensors GPS, and GSM Multilateration. The application will receive location information and is configured to not care about where the sensor data come from, as long as it conforms to the subscription settings. If the GPS were to fail while the application is using "/location" sensor data, the sensor hierarchy module 150 is configured to "failover", or simply continue to use only GSM Multilateration to provide the location data to the application subscribed to "/location". The sensor hierarchy used this way allows for greater uptime for the application and reduce the power consumption as each application does not need to continue poll the GPS sensor even when it is disabled or non-functioning.

The system also provides the flexibility for applications to subscribe or access the specific physical sensor, such as "/location/gps", directly.

As described with reference to FIG. 3b, the system provides an easy method of adding and/or removing sensors from the sensor hierarchy. Sensors can be added or removed dynamically as they become available, or as they fail, while being transparent to the applications using, or subscribed indirectly via a hierarchical identifier in the sensor hierarchy, the sensor data.

Robustness of the system is also increased. For example, when a physical sensor becomes unavailable for any reason, the parent nodes continue operating given the sensor hierarchy topology.

A person skilled in the art will appreciate that these advantages will be significant when larger networks (such as ones with tens of hundreds of nodes and edges) are used allowing for even greater savings on CPU usage, battery power usage, memory usage, and storage usage.

Further advantages and flexibilities are also allowable using sensor hierarchies with the other embodiments and enhancements are discussed under the headings "Virtual Sensors and Multi-layer Inference", "Quality of Service (QoS) Requirements", and "Sensor Health Metrics".

Virtual Sensors and Multi-Layer Inference

Figure 5:
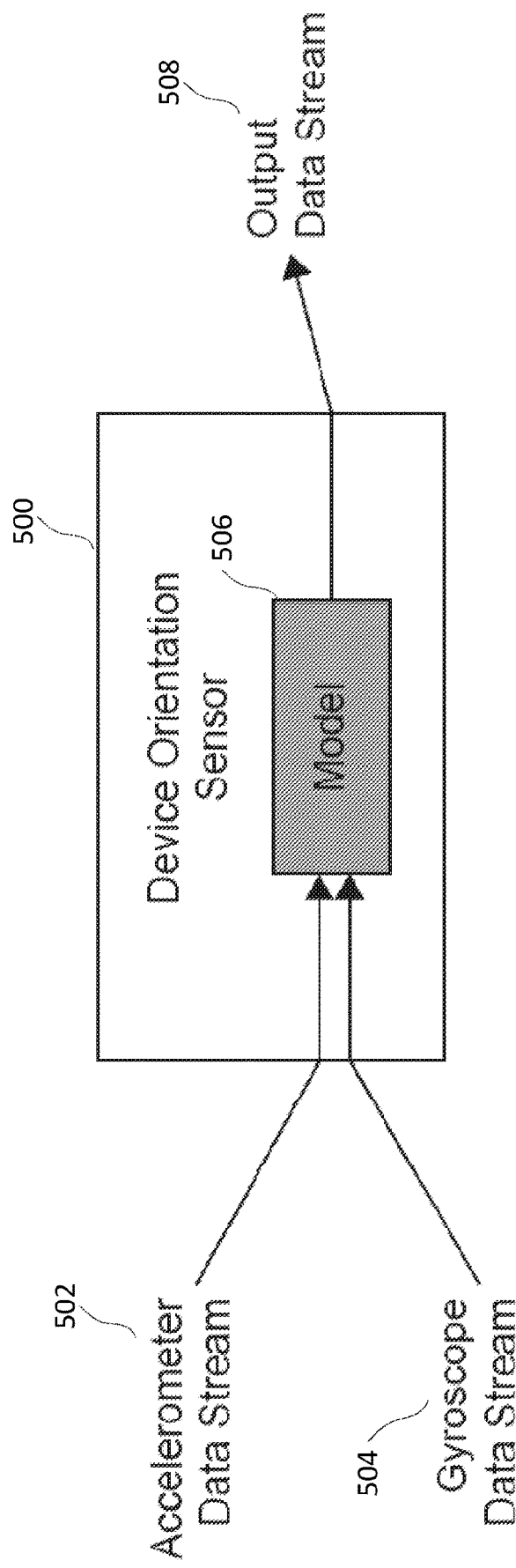
FIG. 5 is a block diagram of a virtual sensor.

The preceding embodiments and examples described the use of physical sensors within the context of a sensor hierarchy. With reference to FIG. 5, in this embodiment, a virtual sensor 500 with two sensor inputs 502, 504 a model 506 and one output 508 is shown. The virtual sensor 500 is a software based sensor which takes input from at least one other sensor. Alternatively, the virtual sensor is implemented as a hardware module. The input(s) to the virtual sensor can be from a physical or virtual sensor. The virtual sensor 500 can also be considered a compound sensor as it can be configured to take input from a plurality of other sensors. The virtual sensor 500 outputs at least one output similar to a physical sensor. The output can be subscribed to as with a physical sensor.

In this example, the virtual sensor 400 takes both accelerometer and gyroscope data and outputs orientation data. A model is used to generate the output(s) based on the two inputs. In this example embodiment, the model is a Kalman filter. Alternatively a kinematic model is used. Depending on the type of inputs and outputs required, other models may be used. The type and form of model is beyond the scope of the present application. A person skilled in the art will appreciate that models or other methods may be used to receive input sensor data and generate an output, where the model comprises rules and concepts to estimate a real world state without having a sensor or data directly representing the real world state. In this example, the virtual sensor 400 takes both accelerometer and gyroscope data and outputs orientation data.

The primary purpose of a virtual sensor is to provide context inference for an application. Using virtual sensor(s) in sensor hierarchies allows context inference to be modelled using a more distributed system compared with prior art (described with reference to FIG. 7).

Similar to a physical sensor as described in the "sensor hierarchy" section, the virtual sensor 400, when in a sensor hierarchy, has hierarchical identifiers associated with it.

The method of inserting a virtual sensor is similar to that of inserting 350 a physical sensor as described with reference to FIG. 3B. The steps are the same except for additionally inserting the input data sources as edges into the sensor hierarchy. Where the physical sensor nodes do not have any nodes that they subscribe to, the virtual sensor does have edges that connect it to other nodes within the sensor hierarchy. These edges are distinct from the edges between hierarchical identifiers. The edges to other nodes of the virtual sensor can be considered a subscription of the virtual sensor to the node the edge is connected to.

Figure 6:
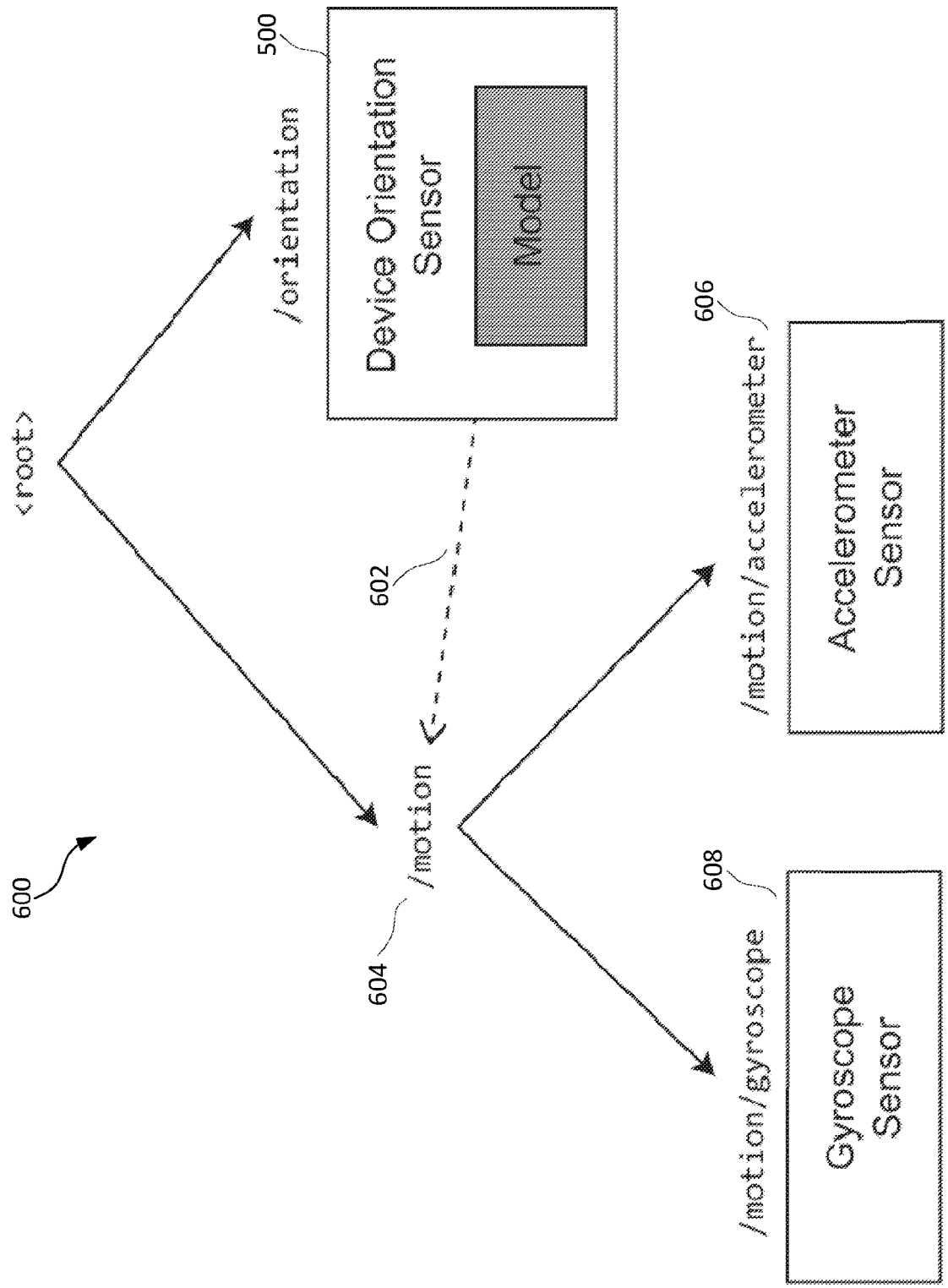
FIG. 6 is an example sensor hierarchy.

Referring to FIG. 6, a virtual sensor 500 is within a sensor hierarchy 600. In this example sensor hierarchy 600, the virtual sensor has two inputs, accelerometer data and gyroscope data and hierarchical identifier of "/orientation". By subscribing to the "/motion" hierarchical identifier, the virtual sensor will receive gyroscope and accelerometer data. The subscription is shown by the dashed edge 602. Alternatively, the virtual sensor could subscribe directly to both of the "/motion/gyroscope" node 608 and the "/motion/accelerometer" node 606.

FIG. 7 shows a prior art activity inference system. In this prior art system a single monolithic model is in the "activity" node and the model receives data from all of the magnetometer, gyroscope, accelerometer, and GPS sensors individually.

Figure 8:
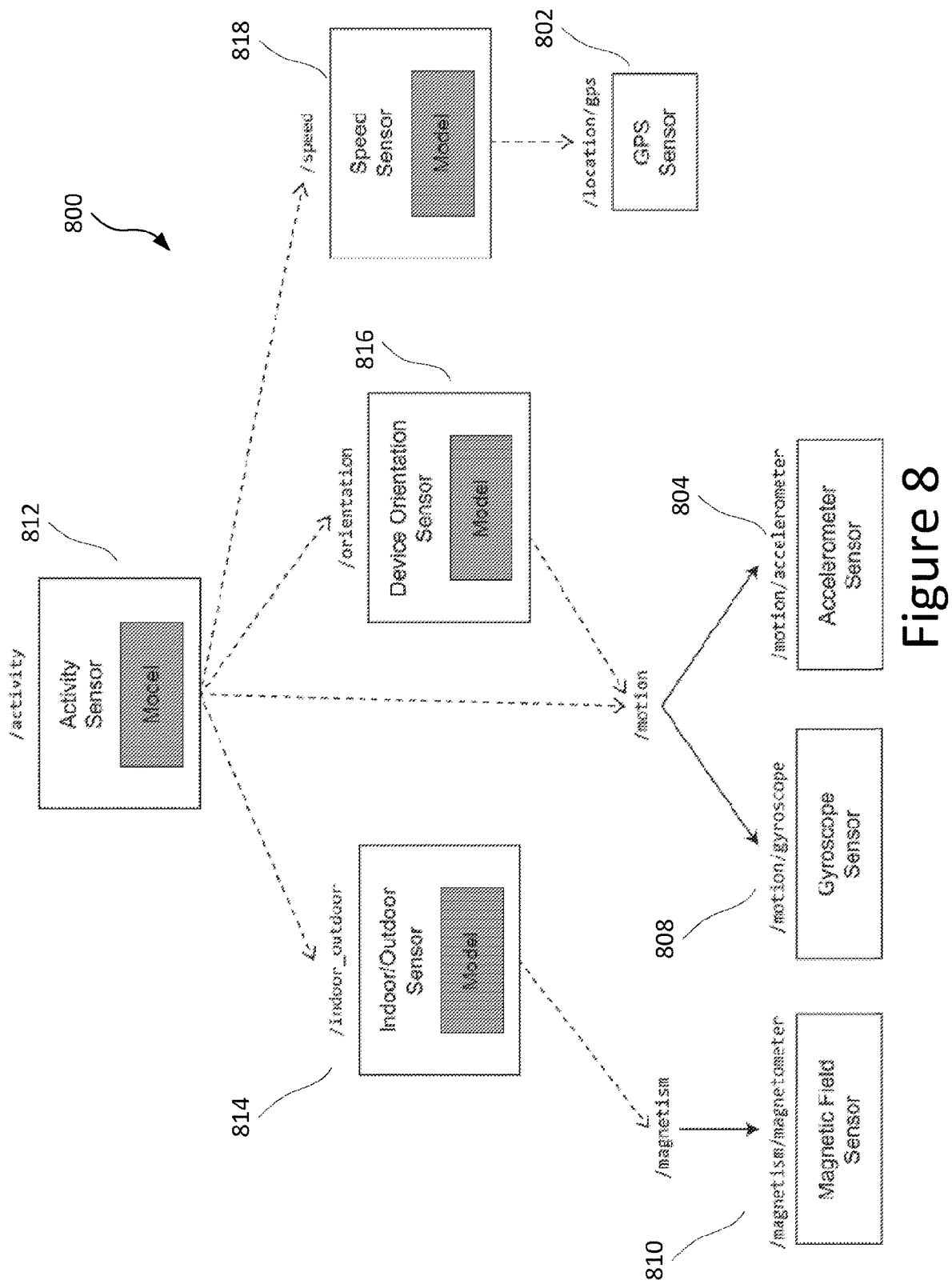
FIG. 8 is an example sensor hierarchy.

Referring to FIG. 8, a subset of a sensor hierarchy 800 with a plurality of physical sensors 802, 804, 806, 808, 810 and virtual sensors 814, 816, 818 is shown. This subset of a sensor hierarchy 800 is configured to be inserted at a root node of a sensor hierarchy. For example, the sensor hierarchy 250 as described with reference to FIG. 2B. The ultimate parent node in this subset sensor hierarchy 800 is a virtual sensor. A person skilled in the art will appreciate that the GPS sensor of the subset sensor hierarchy 800 will be the same GPS sensor of sensor hierarchy 250 for example and understand that the parent/child relationships will updated and stored accordingly. The ultimate sensor hierarchy has not been shown for simplicity's sake.

Advantages

By using virtual sensors, models can be highly specialised and optimised for specific functions. Rather than a human activity model using accelerometers, gyroscopes, magnetometers, ambient light, location, and more as inputs into one large very complex model, the task is split up into smaller diversified models. For example, device orientation is calculated from accelerometer and gyroscope data, straight-line speed is calculated from location, and whether a person is indoors or outdoors from magnetometer data.

Diversifying the models has many benefits:
Overall power consumption is reduced,
Total binary size of the models is often reduced, decreasing persistent storage usage and RAM usage,
Models can be dynamically loaded and unloaded to further decrease CPU and RAM usage (e.g. unload the speed model when indoor/outdoor virtual sensor suggests that the user is indoors),
Models can be reused for other purposes,
Models are easier to maintain,
Models are inherently more explainable, allowing for better and easier debugging and understandability for model or application authors.

These benefits are of particular importance to the personal computing device 100 with the CPU power, battery power, RAM, storage, and other limitations.

The subset of a sensor hierarchy 800 shows the advantages of providing a distributed or modularised context inference system. A first application interested in the current "activity" can subscribe to the "/activity" hierarchical identifier. A second application only interested in the "indoor/outdoor" information can subscribe to the "/indoor_outdoor" hierarchical identifier. The "/indoor_outdoor" identifier needs only be calculated once for the "activity" hierarchical identifier and for the second application subscribed to "/indoor_outdoor". The model for "activity" is simplified as it doesn't need to know how to calculate or model "indoor/outdoor". Further, the first and second applications are simplified as they don't need context inference models inbuilt. Further still, total code that would be needed for an "indoor/outdoor" inference model and "activity" inference model is reduced as the "indoor/outdoor" is effectively reused by the second application. Reducing total code reduces the system resources required on the personal computing device. Calculating the "indoor/outdoor" virtual sensor output only once (when two applications are using the data) reduces CPU power. The prior art system of described with reference to FIG. 7 would have required reading sensor data from the magnetometer once for the application inferring "activity" and once for the application inferring "indoor/outdoor". Reducing required CPU power increases battery life of the personal computing device 100.

Quality of Service (QoS) Requirements

QoS requirements are a mechanism for reducing overall power consumption of a given sensor hierarchy by specifying minimum levels of service. QoS requirements can also allow each sensor to enter power-saving modes when not needed.

The QoS requirements are part of the subscription settings as described in the "Sensor Hierarchy" section. That is to say that the QoS requirements are set as a part of the initial subscription of an application to a sensor or node in the sensor hierarchy, or can be updated on a pre-existing subscription of an application to a sensor or node in the sensor hierarchy.

QoS requirements can take many different forms. QoS requirements can be any one or more of the following:
- The rate at which data must be produced (e.g. 20 Hz or 20 data points per second)
- A specification for bursts of data (e.g. on for 2 seconds, off for 10 seconds)
- Maximum amount of power that may be consumed (e.g. 10 mW)
- Accuracy of the data (e.g. with $10^{-3}$ rad/s)

The QoS requirements can be set once when a subscribers (such as an application or virtual sensor) subscribes to a hierarchical identifier or updated during operation and/or in a reaction to certain conditions. As an example, if the battery level is getting low, the subscribing applications or even the sensor hierarchy module 150 may update the subscriptions to require that certain power usages are limited or minimized.

In each case, the QoS requirements determine the minimum level of service required, but, if a sensor is unable to provide the required level of service, then it should aim to provide as close to the minimum required level of service possible. For example, if the GPS sensor cannot provide an updated location 20 times per second, then the GPS subscriptions service (the sensor hierarchy module 150 in the present embodiment) will try to poll the GPS sensor at least 20 times per second. In another example, if data points are provided at a frequency faster than 20 times per second by the sensor, then the subscription service will drop data points such that only 20 data points per second are provided to the application. In this case, battery power will be saved as the applications will not be receiving and processing data that they have not requested.

As another example, a subscriber application is subscribed to "/orientation". The application requires a data rate of 1 Hz. The device orientation sensor is a virtual sensor and propagates a requirement to "/motion" (the hierarchy identifier the virtual orientation sensor subscribes to) of a 10 Hz data date and a bursting of 100 ms on, 900 ms off. All sensors directly connected to "/motion" ("/motion/accelerometer" and "/motion/gyroscope") receive these requirements and adjust their sampling profiles according.

In another example, inertial measurement sensors such as accelerometers and gyroscopes are used by a multitude of context inference situations and as such other virtual sensors and applications each of which will likely have their own QoS requirements. In this case, a minimum common requirement is calculated to satisfy all of the QoS requirements if possible for a given hierarchy identifier. If one virtual sensor requires 10 Hz and another requires 50 Hz, then the 50 Hz rate will be the rate at which data from the sensor is produced. This preserves the aforementioned constraints and adheres to the fact that QoS requirements behave as minimum service level requirements.

If two or more QoS requirements are in conflict, such as 10 Hz minimum data provided and 10 mW maximum power consumed, but only 5 Hz is possible under 10 mW, then there are options on how to resolve the conflicting requirements. Prioritisation of subscribers is one method. In this case, subscribers have an associated priority level and the subscriber with the higher priority level will have their QoS requirement adhered to and the other not. Another option is to adhere to the lower power requirement. In either case an error or warning is returned to all of the subscribers that their subscriptions may not be adhering to the QoS requirement that they have set.

Sensor Health Metrics

Sensor health metrics act like the inverse of QoS requirements. Instead of enforcing a minimum level of service by the subscribers onto the sensors and sensor hierarchy generally, the sensor itself reports its capabilities to any subscribers at the point of subscription or when queried.

Sensor health metrics can include any one or more of the following:
- Sensor manufacturer and model name,
- Power consumption,
- Maximum frequency achievable,
- Minimum frequency available,
- Maximum precision achievable,
- Maximum accuracy achievable,
- Latency, and
- Other known limitations and bugs.

These metrics can be inferred directly from the sensor itself or otherwise from a database of sensor health metrics.

Consider a virtual sensor which has a model that can be improved with magnetometer data. On some personal computing devices 100, the magnetometer may not be precise enough and so will not provide useful data to the virtual sensor model. The virtual sensor model modifies its behaviour in response to receiving the sensor health metrics. For example, upon receiving the sensor health metrics, the virtual sensor can decide at run time whether the magnetometer is suitable for its needs and can instead dynamically select a more suitable model and not enable the magnetometer thereby saving power.

Similarly, application subscribed to data from a sensor that has provided sensor health metrics can modify their behaviour.

Again considering virtual sensors where the model is a Kalman filter, or other filter that can use the accuracy and/or precision of its inputs, the sensor metrics are provided to the Kalman filter which uses the input error in the prediction step. Other models may also use sensor metrics similarly to obtain better model predictions.

Content Based Subscriptions

A content-based subscription (or direct or immediate access) is a further embodiment to allow for a subscriber to filter out data obtained from the hierarchical label they are subscribed to instead of receiving all data outputted at that hierarchical label. In this embodiment, the subscription request further comprises data indicative of a filter. The subscription broker applies the filter to any data from the hierarchical label subscribed to, and if the data from the subscription matches the filter, the broker passes the sensor data onto the subscriber.

For example, a subscriber is only interested "running" sensor events that relate to when a user is running or jogging. The subscriber subscribes to "/activity" using the normal process as described in the previous sections of this document, but the subscription settings further comprise a filter of "Activity: Running". The subscription broker will only send data to the subscriber if the data from "/activity" matches through the filter, i.e. data indicative of a user running.

The described embodiments of the invention are only examples of how the invention may be implemented. Modifications, variations and changes to the described embodiments will occur to those having appropriate skills and knowledge. These modifications, variations and changes may be made without departure from the scope of the claims.

The invention claimed is:

1. A personal computing device configured to provide a sensor hierarchy for a subscriber comprising:
   a virtual sensor module, configured to receive or retrieve values from a sensor and wherein the sensor module is a virtual sensor configured to receive data from at least one other sensor module;
   a memory module, configured to store data indicative of a sensor hierarchy; and
   a sensor hierarchy module, configured to:
      obtain the sensor hierarchy;
      receive data indicative of virtual sensor module;
      identify at least one hierarchical identifier based on the data indicative of the virtual sensor module;
      locate and/or insert a node in the sensor hierarchy corresponding to the hierarchical identifier; and
      optionally update the node in the sensor hierarchy corresponding to the hierarchical identifier with data to enable a subscriber to subscribe to the node.

2. A personal computing device according to claim 1, wherein the subscriber receives sensor data from the sensor module according to the subscription request.

3. A personal computing device according to claim 1, wherein the sensor module is a virtual sensor module configured to receive data from at least one further sensor module(s), and/or configured to receive data from a plurality of further sensor modules.

4. A personal computing device according to claim 1, wherein the virtual sensor comprises a model.

5. A personal computing device according to claim 4, wherein the model:
   receives input from the at least one hierarchical identifier the virtual sensor is subscribed to; and/or
   receives input from the at least one hierarchical identifier the virtual sensor is subscribed to; and/or
   outputs at least one output to be subscribed to by a subscriber, preferably wherein:
      the subscriber is an application or a further virtual sensor; and/or
      the output of the model is a context inference based on the at least one input hierarchical identifier.

6. A personal computing device according to claim 1, wherein the virtual sensor is arranged:
   to provide sensor data from each functioning sensor beneath the virtual sensor in the sensor hierarchy; and/or
   not to provide sensor data from each non-functioning sensor beneath the virtual sensor in the sensor hierarchy.

7. A personal computing device according to claim 1, wherein the sensor hierarchy module is further configured to: receive data indicative of a quality of service requirement, wherein the data indicative of a quality of service requirement comprises a hierarchical identifier and quality of service requirement.

8. A personal computing device according to claim 7, wherein:
   the quality of service requirement specifies a minimum level of service of a subscription associated with the hierarchical identifier; and/or
   the quality of service requirement relates to a quality of service for each sensor beneath the hierarchical identifier; and/or
   the quality of service requirement is any one or more of the following:
      a rate at which data is to be produced for a subscription associated with the hierarchical identifier,
      a specification for bursts of data to be produced for a subscription associated with the hierarchical identifier,
      a maximum amount of power to be consumed for a subscription associated with the hierarchical identifier, or
      an accuracy of data to be produced for a subscription associated with the hierarchical identifier.

9. A personal computing device according to claim 7, wherein the sensor hierarchy receives further data indicative of a quality of service requirement data in conflict with the first data indicative of a quality of service; and selects a quality of service requirement to adhere to both the first quality of service requirement and the further quality of service requirement.

10. A personal computing device according to claim 7, wherein the quality of service relates to the subscriber and/or wherein the quality of service relates to a priority of the subscriber relative to other subscribers.

11. A personal computing device according to claim 1, wherein subscribing the subscriber to the hierarchical identifier comprises arranging for sensor data from at least one of the child nodes of the node corresponding to the hierarchical identifier to be sent to the subscriber.

12. A personal computing device according to claim 1, wherein:
   the subscriber is configured to provide context inference based on the hierarchical identifiers the subscriber is subscribed to; and/or
   the subscriber is an application or a component of an application; and/or
   the subscription request further comprises data indicative of a quality of service requirement.

13. A personal computing device according to claim 1, wherein the sensor module is a physical sensor module.

14. A personal computing device according to claim 1, wherein the sensor module is configured to transmit sensor health metric data, the health metric data comprises data indicative of the sensor and capabilities of the sensor.

15. A personal computing device according to claim 14, wherein the health metric data comprises any one or more of the following:
   sensor manufacturer and model name,
   sensor power consumption,
   maximum sensor data frequency achievable,
   minimum sensor data frequency available,
   maximum sensor data precision achievable,
   maximum sensor data accuracy achievable,
   sensor data latency,
   known bugs of the sensor, and/or
   other known limitations of the sensor.

16. A personal computing device according to claim 14, wherein:
   the subscriber receiving sensor health metric data modifies its behaviour; and/or
   the subscriber is a virtual sensor comprising a model and upon receiving sensor health metric data, the model is dynamically updated to account for the sensor health metric data.

17. A personal computing device according to claim 1, wherein:
   the data indicative of virtual sensor module comprises a model; and/or
   the sensor hierarchy module is further configured to subscribe the virtual sensor module to another hierarchical identifier in the sensor hierarchy.

18. A computer-implemented method of providing a sensor hierarchy for a subscriber, comprising:
- receiving or retrieving at a virtual sensor module values from a sensor;
- storing in a memory module data indicative of a sensor hierarchy, wherein the sensor hierarchy comprises a plurality of nodes wherein each node comprises at least one hierarchical identifier and at least one node comprises data indicative of the sensor module;
- obtaining the data indicative of the sensor hierarchy from the memory module;
- receiving data indicative of a virtual sensor module;
- identifying at least one hierarchical identifier based on the data indicative of the virtual sensor module;
- locating and/or inserting a node in the sensor hierarchy corresponding to the hierarchical identifier; and
- optionally updating the node in the sensor hierarchy corresponding to the hierarchical identifier with data to enable a subscriber to subscribe to the node.

19. A personal computing device configured to provide a sensor hierarchy for a subscriber comprising:
- a sensor module, configured to receive or retrieve values from a sensor;
- a memory module, configured to store data indicative of a sensor hierarchy, wherein the sensor hierarchy comprises a plurality of nodes wherein each node comprises at least one hierarchical identifier and at least one node comprises data indicative of the sensor module; and
- a sensor hierarchy module, configured to:
  - obtain the data indicative of the sensor hierarchy from the memory module;
  - receive a subscription request from the subscriber, wherein preferably the subscription request comprises data indicative of the hierarchical identifier to subscribe to;
  - optionally locate the hierarchical identifier of the subscription request within the sensor hierarchy; and
  - subscribe the subscriber based on the subscription request;
- wherein the sensor module is configured to transmit sensor health metric data, the health metric data comprises data indicative of the sensor and capabilities of the sensor; and
- wherein the health metric data comprises any one or more of the following:
  - sensor manufacturer and model name,
  - sensor power consumption,
  - maximum sensor data frequency achievable,
  - minimum sensor data frequency available,
  - maximum sensor data precision achievable,
  - maximum sensor data accuracy achievable,
  - sensor data latency,
  - known bugs of the sensor, and/or
  - other known limitations of the sensor.

* * * * *